US012247261B1

(12) United States Patent
Fan et al.

(10) Patent No.: US 12,247,261 B1
(45) Date of Patent: Mar. 11, 2025

(54) ORIENTED ELECTRICAL STEEL WITH HIGH MAGNETIC INDUCTION AND ANNEALING METHOD THEREOF

(71) Applicant: Inner Mongolia University of Technology, Hohhot (CN)

(72) Inventors: Lifeng Fan, Hohhot (CN); Yujie Fu, Hohhot (CN); Erbin Yue, Hohhot (CN); Lijun Xiao, Hohhot (CN); Jiao Huang, Hohhot (CN); Yanyun Bai, Hohhot (CN); Li Sun, Hohhot (CN); Feng Guo, Hohhot (CN)

(73) Assignee: Inner Mongolia University of Technology, Hohhot (CN)

( * ) Notice: Subject to any disclaimer, the term of this patent is extended or adjusted under 35 U.S.C. 154(b) by 0 days.

(21) Appl. No.: 18/901,011

(22) Filed: Sep. 30, 2024

(30) Foreign Application Priority Data

Jun. 4, 2024 (CN) ......................... 202410716560.0

(51) Int. Cl.

| | |
|---|---|
| ***C21D 1/26*** | (2006.01) |
| ***C21D 1/76*** | (2006.01) |
| ***C21D 1/84*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/16*** | (2006.01) |
| ***C22C 38/60*** | (2006.01) |
| *H01F 1/147* | (2006.01) |

(52) U.S. Cl.

CPC ................. *C21D 1/26* (2013.01); *C21D 1/76* (2013.01); *C21D 1/84* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/16* (2013.01); *C22C 38/60* (2013.01); *C22C 2202/02* (2013.01); *H01F 1/14775* (2013.01)

(58) Field of Classification Search
None
See application file for complete search history.

(56) References Cited

FOREIGN PATENT DOCUMENTS

| | | | | |
|---|---|---|---|---|
| CN | 107858494 A | | 3/2018 | |
| CN | 110791635 A | * | 2/2020 | ........... C21D 8/1222 |
| CN | 115505694 A | | 12/2022 | |

OTHER PUBLICATIONS

Notice of Allowance for CN 202410716560.0 from CNIPA and Allowed Claims.
First Examination for 202410716560.0 from CNIPA and Allowed Claims.

* cited by examiner

*Primary Examiner* — Anthony M Liang

(57) ABSTRACT

The present disclosure relates to a technical field of iron and steel material, in particular to an oriented electrical steel with high magnetic induction and annealing method thereof. Impeccable secondary recrystallization and single Goss texture are formed by controlling the heating rate and the atmosphere of the annealing treatment, confirming beginning and ending temperature in accordance with different heating rate. The orientation density of the Goss texture is more than 145. The magnetic induction intensity $B_8$ is increased by 1-3% compared with products of same grade.

3 Claims, 1 Drawing Sheet

ORIENTED ELECTRICAL STEEL WITH HIGH MAGNETIC INDUCTION AND ANNEALING METHOD THEREOF

CROSS-REFERENCE TO RELATED APPLICATIONS

This application claims priority to Chinese Patent Application No. 202410716560.0 with a filing date of Jun. 4, 2024. The content of the aforementioned application, including any intervening amendments thereto, is incorporated herein by reference.

TECHNICAL FIELD OF THE INVENTION

The present disclosure relates to a technical field of iron and steel material, in particular to an oriented electrical steel with high magnetic induction and an annealing method thereof.

BACKGROUND OF THE INVENTION

Cold-rolled oriented electrical steel with high magnetic induction (Hi-B steel) is a Si—Fe soft magnetic alloy with a single texture of {110}<001> (i.e., Goss texture). Hi-B steel in which AlN is used as a main inhibitor, is produced by low temperature heating, high temperature normalizing, one time cold rolling with high reduction ratio, decarburizing and nitriding treatment, and high temperature annealing, and used to produce iron core of UHV AC and DC transmission and distribution transformer and high-rating generator stator due to the property of high magnetic induction and low iron loss. It's indispensable and important soft magnetic materials in power, electronic, and military industry fields.

High temperature annealing which is a key procedure of producing an oriented electrical steel with high magnetic, plays an important role in secondary recrystallizing. The main influence factors of the secondary recrystallizing are temperature and heating rate. In prior art, the heating rate is changed to make secondary recrystallizing sufficient during annealing, and the temperature is set to cover the secondary recrystallizing temperature range, and even higher than 1200° C., wherein the heating rate is controlled at 20-60° C./h when the temperature is 800-1230° C., the heating rate range is large and the upper limit of temperature reaches 1230° C. Another solution in the prior art is keeping the heating rate constant, however, the heating rate should be set to 20° C./h and temperature range to 900-1200° C. in order to make the secondary recrystallization sufficient. there is also a solution to set the temperature range incontinual, which makes it impossible to produce.

SUMMARY OF THE INVENTION

In order to solve the problems of the above-mentioned prior art, the main object of the present disclosure is to provide an oriented electrical steel with high magnetic induction and an annealing method thereof.

In order to achieve the above object, according to one aspect of the present disclosure, the following technical solution is provided.

An annealing method of an oriented electrical steel with high magnetic induction, comprises the following steps.

S1, carrying out a first stage of heating on the oriented electrical steel with high magnetic induction.

S2, carrying out a second stage of heating on the oriented electrical steel with high magnetic induction, and adjusting a secondary recrystallizing procedure according to a heating rate.

S3, maintaining temperature of the oriented electrical steel with high magnetic induction.

S4, cooling the oriented electrical steel with high magnetic induction.

As a preferred embodiment of the annealing method of the oriented electrical steel with high magnetic induction, according to the present disclosure, wherein the specific details of the first stage of heating in the step S1 are as follows.

S11, injecting nitrogen into an annealing furnace to prepare for annealing. Nitrogen flow rate is 10-50 $m^3$/h.

S12, heating from room temperature to 500° C. at the rate of 100-200° C./h. Atmosphere of the annealing furnace is nitrogen. Nitrogen flow rate is 10-50 $m^3$/h.

S13, heating from 500° C. to 600° C. at the rate of 50-100° C./h. The atmosphere of the annealing furnace is gas mixture of nitrogen and hydrogen. Gas mixture flow rate is 10-50 $m^3$/h. A volume ratio of the nitrogen to the hydrogen is (2-3):1.

S14, maintaining temperature at 600° C. for 5-10 h. The atmosphere of the annealing furnace is gas mixture of nitrogen and hydrogen. Gas mixture flow rate is 10-50 $m^3$/h. A volume ratio of the nitrogen to the hydrogen is (1-2):1.

S15, heating from 600° C. to 1000° C. at the rate of 50-60° C./h. The atmosphere of the annealing furnace is gas mixture of nitrogen and hydrogen. Gas mixture flow rate is 10-20 $m^3$/h. A volume ratio of the nitrogen to the hydrogen is 1:(2-3).

As a preferred embodiment of the annealing method of the oriented electrical steel with high magnetic induction, according to the present disclosure, wherein the specific details of the first stage of heating in the step S2 are as follows.

When heating rate V is not more than 5° C./h, heating from 1000° C. to 1035° C., maintaining temperature at 1035° C. for 1-2 h, and then heating from 1035° C. to 1120° C. at the rate of 50-100° C./h.

When the heating rate V is more than 5° C./h but not more than 15° C./h, heating from 1000° C. to 1045° C., maintaining temperature at 1045° C. for 2-3 h, and then heating from 1045° C. to 1120° C. at the rate of 50-100° C./h.

When the heating rate V is more than 15° C./h but not more than 25° C./h, heating from 1000° C. to 1055° C., maintaining temperature at 1055° C. for 3-4 h, and then heating from 1055° C. to 1120° C. at the rate of 50-100° C./h.

As a preferred embodiment of the annealing method of the oriented electrical steel with high magnetic induction, according to the present disclosure, in the step S2, atmosphere of an annealing furnace is gas mixture of nitrogen and hydrogen. Gas mixture flow rate is 10-20 $m^3$/h. A volume ratio of the nitrogen to the hydrogen is 1:(3-4).

As a preferred embodiment of the annealing method of the oriented electrical steel with high magnetic induction, according to the present disclosure, in the step S3, maintaining temperature at 1120° C. for 20-30 h. Atmosphere of an annealing furnace is hydrogen. Hydrogen flow rate is 10-15 $m^3$/h.

As a preferred embodiment of the annealing method of the oriented electrical steel with high magnetic induction, according to the present disclosure, wherein specific details of cooling in the step S4 are as follows.

S41, cooling from 1120° C. to 1000° C. at the rate of 30-50° C./h. Atmosphere of an annealing furnace is hydrogen. Hydrogen flow rate is 10-15 $m^3$/h.

S42, cooling from 1000° C. to 500° C. at the rate of 50-100° C./h. The atmosphere of the annealing furnace is gas mixture of nitrogen and hydrogen. Gas mixture flow rate is 5-10 $m^3$/h. A volume ratio of the nitrogen and the hydrogen is (2-3):1.

S43, cooling from 500° C. to room temperature. The atmosphere of the annealing furnace is nitrogen. Nitrogen flow rate is 5-10 $m^3$/h.

In order to achieve the above object, according to another aspect of the present disclosure, the following technical solutions are provided.

An oriented electrical steel with high magnetic induction, produced by the method mentioned above.

As a preferred embodiment of an oriented electrical steel with high magnetic induction according to the present disclosure, wherein the oriented electrical steel with high magnetic induction includes, by mass percentage, 0.04-0.08 wt % C, 3.0-4.0 wt % Si, 0.05-0.2 wt % Mn, 0.004-0.012 wt % S, 0.01-0.04 wt % Al, 0.004-0.012 wt % N, 0.01-0.03 wt % Cu, 0.03-0.08 wt % Sn or Sb, 0.002-0.01 wt % RE, a balance being Fe and unavoidable impurities that are present in trace amounts.

As a preferred embodiment of the oriented electrical steel with high magnetic induction according to the present disclosure, wherein the texture of the oriented electrical steel with high magnetic induction is single Goss texture. The orientation density of the Goss texture is more than 145. The magnetic induction intensity $B_8$ is increased by 1-3% compared with products of same grade.

The advantages of the present disclosure are as follows:

The present disclosure provides an oriented electrical steel with high magnetic induction and an annealing method thereof. Impeccable secondary recrystallization and single Goss texture are formed by controlling heating rate and atmosphere of annealing treatment, confirming beginning and ending temperature in accordance with different heating rate. The orientation density of the Goss texture is more than 145. The magnetic induction intensity $B_8$ is increased by 1-3% compared with products of same grade.

BRIEF DESCRIPTION OF THE DRAWINGS

In order to more clearly illustrate the technical solutions in the present disclosure or prior art, the drawings are used in the embodiments or the description of the prior art will be briefly introduced below. It should be understood that, the drawings in the following description are only examples of the present disclosure. For those skilled in the art, other drawings can be obtained based on these drawings without creative works.

Figure 1:
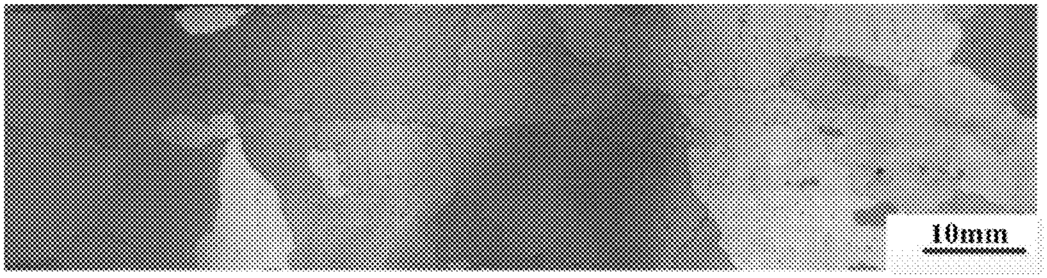
FIG. 1 is a microstructure diagram of the oriented electrical steel with high magnetic induction produced by example 1 of the present disclosure.

Further illustration about the achievement of the object, the functions and the advantages of the present disclosure will be showed according to the drawings.

DETAILED DESCRIPTION OF THE INVENTION

A clear and complete description will be made below in conjunction with the technical solutions in the embodiments. Apparently, the described embodiments are only some of the embodiments of the present disclosure, but not all of them. Based on the embodiments of the present disclosure, all other embodiments obtained by persons of ordinary skill in the art without inventive efforts fall within the protection scope of the present disclosure.

Research of the present disclosure discloses that the heating rate in the temperature range of the secondary recrystallizing of the oriented electrical steel with high magnetic induction must be limited. The beginning temperature of abnormal growth of secondary grain depends on the size of inhibitor and the drive force of the growth of the secondary grain. The inhibitor becomes coarsening due to the increase of the heating rate, which leads to reducing the inhibition ability. Thus, Goss grains and other grains with other oriented grow up at the same time. The base becomes unstable. The higher the heating rate is, the more inaccurate the orientation of the Goss grains are. So different heating rates should be in accordance with optimal secondary recrystallizing temperature range. The optimal Goss texture and orientation density can be obtained by matching the heating rates and the secondary recrystallizing temperature range. The higher the heating rate is, the longer the maintaining temperature time during the secondary recrystallizing is. However, in prior art, in order to finish the secondary recrystallizing procedure, the heating rate is controlled in a certain range and the temperature is within a larger range to realize full cover. This method is not optimal because it's impossible to confirm the corresponding beginning and ending temperature according to the heating rate in prior art. The secondary recrystallizing temperature range in accordance with different heating rates is researched in the present disclosure. It can be seen that difference value of the secondary recrystallizing temperature at different heating rate is 35-55° C., which is more than upper limit of the secondary recrystallizing temperature range in the present disclosure and leads to increase of island crystal and incomplete secondary recrystallizing. Thus, heating rate corresponding to the beginning and ending temperature should be controlled accurately and then increased. In order to make the secondary recrystallization sufficient, temperature of which the secondary recrystallizing is completed should be maintained for a period of time. Thus, orientation of grains is more accurate and maximum temperature can be decreased to an extreme.

The research of the present disclosure also discloses that a main procedure is pre-heat treatment when temperature is low in order to achieve the temperature at which crystal water can be wiped off and increase the heating rate to save time. However, if heating rate is too high crystal water at the outside of steel coil can be wiped off easily and crystal water at the outside of steel coil can be wiped off hardly, because the heat reduction of the oriented electrical steel with high magnetic induction coil is low and the temperature at the inside of the oriented electrical steel with high magnetic induction coil lags behind. The closer the temperature is to the crystal water temperature, the lower the heating rate is. Cooling rate is controlled after high temperature crystallizing procedure. The lower the cooling, the longer the cooling time, which increases the production time. But if the heating rate is too much high, the innerstress of steel strip will be high, which can deteriorate magnetic property. The heating rate and cooling rate are set in the present disclosure to ensure temperature uniformity of the oriented electrical steel with high magnetic induction coil and decrease innerstress of the oriented electrical steel with high magnetic induction strip.

The research of the present disclosure also discloses that nitriding effect is bad when temperature is low during heating procedure. It's necessary to control volume content of nitrogen in atmosphere of annealing furnace to more than 50%, and reduce a proportion of the nitrogen gradually when the temperature exceeds 600° C. because that surface nitriding ability increases with the temperature increasing. Nitriding capacity is 50-100 ppm during the high temperature annealing procedure. Increase of nitrogen content leads to the inhibitor coarsening and losing inhibit ability, primary grains growing up normally and secondary recrystallizing insufficiently. Hydrogen content should be reduced gradually after high temperature crystallizing procedure to maintain the atmosphere in the furnace is mainly nitrogen.

An annealing method of an oriented electrical steel with high magnetic induction, comprises the following steps.

S1, carrying out a first stage of heating on the oriented electrical steel with high magnetic induction.

S2, carrying out a second stage of heating on the oriented electrical steel with high magnetic induction, and adjusting a secondary recrystallizing procedure according to a heating rate.

S3, maintaining temperature of the oriented electrical steel with high magnetic induction.

S4, cooling the oriented electrical steel with high magnetic induction.

As a further improvement, the specific details of the first stage of heating in the step S1 are as follows.

S11, injecting nitrogen into an annealing furnace to prepare for annealing. Nitrogen flow rate is 10-50 $m^3$/h.

S12, heating from room temperature to 500° C. at the rate of 100-200° C./h. Atmosphere of the annealing furnace is nitrogen. Nitrogen flow rate is 10-50 $m^3$/h.

S13, heating from 500° C. to 600° C. at the rate of 50-100° C./h. The atmosphere of the annealing furnace is gas mixture of nitrogen and hydrogen. Gas mixture flow rate is 10-50 $m^3$/h. A volume ratio of the nitrogen to the hydrogen is (2-3):1.

S14, maintaining temperature at 600° C. for 5-10 h. The atmosphere of the annealing furnace is gas mixture of nitrogen and hydrogen. Gas mixture flow rate is 10-50 $m^3$/h. A volume ratio of the nitrogen to the hydrogen is (1-2):1.

S15, heating from 600° C. to 1000° C. at the rate of 50-60° C./h. The atmosphere of the annealing furnace is gas mixture of nitrogen and hydrogen. Gas mixture flow rate is 10-20 $m^3$/h. A volume ratio of the nitrogen to the hydrogen is 1:(2-3).

As a further improvement, specific details of the first stage of heating in the step S2 are as follows.

When heating rate V is not more than 5° C./h, heating from 1000° C. to 1035° C., maintaining temperature at 1035° C. for 1-2 h, and then heating from 1035° C. to 1120° C. at the rate of 50-100° C./h.

When the heating rate V is more than 5° C./h but not more than 15° C./h, heating from 1000° C. to 1045° C., maintaining the temperature at 1045° C. for 2-3 h, and then heating from 1045° C. to 1120° C. at the rate of 50-100° C./h.

When the heating rate Vis more than 15° C./h but not more than 25° C./h, heating from 1000° C. to 1055° C., maintaining the temperature at 1055° C. for 3-4 h, and then heating from 1055° C. to 1120° C. at the rate of 50-100° C./h.

As a further improvement, in the step S2, atmosphere of an annealing furnace is gas mixture of nitrogen and hydrogen. Gas mixture flow rate is 10-20 $m^3$/h. A volume ratio of the nitrogen to the hydrogen is 1:(3-4).

As a further improvement, in the step S3, maintaining temperature at 1120° C. for 20-30 h. Atmosphere of an annealing furnace is hydrogen. Hydrogen flow rate is 10-15 $m^3$/h.

As a further improvement, wherein the specific details of cooling in the step S4 are as follows.

S41, cooling from 1120° C. to 1000° C. at the rate of 30-50° C./h. Atmosphere of an annealing furnace is hydrogen. Hydrogen flow rate is 10-15 $m^3$/h.

S42, cooling from 1000° C. to 500° C. at the rate of 50-100° C./h. The atmosphere of the annealing furnace is gas mixture of nitrogen and hydrogen. Gas mixture flow rate is 5-10 $m^3$/h. A volume ratio of the nitrogen to the hydrogen is (2-3):1.

S43, cooling from 500° C. to room temperature. The atmosphere of the annealing furnace is nitrogen. Nitrogen flow rate is 5-10 $m^3$/h.

In order to achieve the above object, according to another aspect of the present disclosure, the following technical solutions are provided.

An oriented electrical steel with high magnetic induction, produced by the method mentioned above.

As a further improvement, the oriented electrical steel with high magnetic induction includes, by mass percentage, 0.04-0.08 wt % C, 3.0-4.0 wt % Si, 0.05-0.2 wt % Mn, 0.004-0.012 wt % S, 0.01-0.04 wt % Al, 0.004-0.012 wt % N, 0.01-0.03 wt % Cu, 0.03-0.08 wt % Sn or Sb, 0.002-0.01 wt % RE, a balance being Fe and unavoidable impurities that are present in trace amounts.

As a further improvement, the texture of the oriented electrical steel with high magnetic induction is single Goss texture. The orientation density of the Goss texture is more than 145. The magnetic induction intensity $B_8$ is increased by 1-3% compared with products of same grade.

The technical solutions of the present disclosure will be further described below in conjunction with specific examples.

The electrical steel of each example and comparative example includes, by mass percentage, 0.06 wt % C, 3.5 wt % Si, 0.08 wt % Mn, 0.007 wt % S, 0.03 wt % Al, 0.009 wt % N, 0.02 wt % Cu, 0.05 wt % Sn, 0.008 wt % La, a balance being Fe and unavoidable impurities that are present in trace amounts.

Example 1

An annealing method of an oriented electrical steel with high magnetic induction, comprises the following steps.

S1, a first stage of heating on the oriented electrical steel with high magnetic induction was carried out. Specific details were as follows.

S11, nitrogen was injected into an annealing furnace to prepare for annealing. Nitrogen flow rate was 10 $m^3$/h,

S12, the oriented electrical steel with high magnetic induction was heated from room temperature to 500° C. at the rate of 100° C./h. Atmosphere of the annealing furnace was nitrogen. Nitrogen flow rate was 10 $m^3$/h,

S13, the oriented electrical steel with high magnetic induction was heated from 500° C. to 600° C. at the rate of 50° C./h. The atmosphere of the annealing furnace was gas mixture of nitrogen and hydrogen. Gas mixture flow rate was 10 $m^3$/h. A volume ratio of the nitrogen to the hydrogen was 2:1,

S14, temperature was maintained at 600° C. for 5 h. The atmosphere of the annealing furnace was gas mixture of nitrogen and hydrogen. Gas mixture flow rate was 10 $m^3$/h. A volume ratio of the nitrogen to the hydrogen was 2:1,

S15, the oriented electrical steel with high magnetic induction was heated from 600° C. to 1000° C. at the rate of 50° C./h. The atmosphere of the annealing furnace was gas mixture of nitrogen and hydrogen. Gas mixture flow rate was 10 $m^3$/h. A volume ratio of the nitrogen to the hydrogen was 1:2.

S2, a second stage of heating on the oriented electrical steel with high magnetic induction was carried out. A secondary recrystallizing procedure was adjusted according to a heating rate. A heating rate V was 5° C./h. The oriented electrical steel with high magnetic induction was heated from 1000° C. to 1035° C. Temperature was maintained at 1035° C. for 1 h (the secondary grains were not formed at 1010° C., the secondary grains with abnormal growth were formed at 1015° C. and the secondary recrystallizing was fully completed at 1030° C. in this example) and then heated from 1035° C. to 1120° C. at the rate of 50° C./h. The atmosphere of the annealing furnace was gas mixture of nitrogen and hydrogen. Gas mixture flow rate was 10 $m^3$/h. A volume ratio of the nitrogen to the hydrogen was 1:3,

S3, temperature of the oriented electrical steel with high magnetic induction was maintained. The temperature was maintained at 1120° C. for 20 h. The atmosphere of the annealing furnace was hydrogen. Hydrogen flow rate was 10 $m^3$/h,

S4, the oriented electrical steel with high magnetic induction was cooled. Specific details were as follows.

S41, the oriented electrical steel with high magnetic induction was cooled from 1120° C. to 1000° C. at the rate of 30° C./h. The atmosphere of the annealing furnace was hydrogen. Hydrogen flow rate was 10 $m^3$/h,

S42, the oriented electrical steel with high magnetic induction was cooled from 1000° C. to 500° C. at the rate of 50° C./h. The atmosphere of the annealing furnace was gas mixture of nitrogen and hydrogen. Gas mixture flow rate was 5 $m^3$/h. A volume ratio of the nitrogen to the hydrogen was 3:1,

S43, the oriented electrical steel with high magnetic induction was cooled from 500° C. to room temperature. The atmosphere of the annealing furnace was nitrogen. Nitrogen flow rate was 5 $m^3$/h.

FIG. 1 shows the microstructure of the oriented electrical steel with high magnetic induction produced by this example. A test is carried on the oriented electrical steel with high magnetic induction produced by this example. The result shows that the microstructure is a single Goss texture, the orientation density of the Goss texture is 145.86, and the magnetic induction intensity $B_8$ is increased by 1% compared with products of same grade.

Example 2

An annealing method of an oriented electrical steel with high magnetic induction, comprises the following steps.

S1, a first stage of heating on the oriented electrical steel with high magnetic induction was carried out. Specific details were as follows:

S11, nitrogen was injected into an annealing furnace to prepare for annealing. Nitrogen flow rate was 50 $m^3$/h;

S12, the oriented electrical steel with high magnetic induction was heated from room temperature to 500° C. at the rate of 200° C./h. Atmosphere of the annealing furnace was nitrogen. Nitrogen flow rate was 50 $m^3$/h;

S13, the oriented electrical steel with high magnetic induction was heated from 500° C. to 600° C. at the rate of 100° C./h. The atmosphere of the annealing furnace was gas mixture of nitrogen and hydrogen. Gas mixture flow rate was 50 $m^3$/h. A volume ratio of the nitrogen to the hydrogen was 3:1;

S14, the temperature was maintained at 600° C. for 10 h. The atmosphere of the annealing furnace was gas mixture of nitrogen and hydrogen. Gas mixture flow rate was 50 $m^3$/h. A volume ratio of the nitrogen to the hydrogen was 1:1;

S15, the oriented electrical steel with high magnetic induction was heated from 600° C. to 1000° C. at the rate of 60° C./h. The atmosphere of the annealing furnace was gas mixture of nitrogen and hydrogen. Gas mixture flow rate was 20 $m^3$/h. A volume ratio of the nitrogen to the hydrogen was 1:3.

S2, a second stage of heating on the oriented electrical steel with high magnetic induction was carried out. A secondary recrystallizing procedure was adjusted according to a heating rate. The heating rate V was 15° C./h, The oriented electrical steel with high magnetic induction was heated from 1000° C. to 1045° C. Temperature was maintained at 1045° C. for 3 h (secondary grains were not formed at 1025° C., secondary grains with abnormal growth were formed at 1030° C. and secondary recrystallizing was fully completed at 1040° C. in this example), and then the oriented electrical steel with high magnetic induction was heated from 1045° C. to 1120° C. at the rate of 100° C./h. The atmosphere of the annealing furnace was gas mixture of nitrogen and hydrogen. Gas mixture flow rate was 20 $m^3$/h. A volume ratio of the nitrogen to the hydrogen was 1:4.

S3, temperature of the oriented electrical steel with high magnetic induction was maintained. The temperature was maintained at 1120° C. for 30 h. The atmosphere of the annealing furnace was hydrogen. Hydrogen flow rate was 15 $m^3$/h;

S4, the oriented electrical steel with high magnetic induction was cooled. Specific details were as follows:

S41, the oriented electrical steel with high magnetic induction was cooled from 1120° C. to 1000° C. at the rate of 50° C./h. The atmosphere of the annealing furnace was hydrogen. Hydrogen flow rate was 15 $m^3$/h;

S42, the oriented electrical steel with high magnetic induction was cooled from 1000° C. to 500° C. at the rate of 100° C./h. The atmosphere of the annealing furnace was gas mixture of nitrogen and hydrogen. Gas mixture flow rate was 10 $m^3$/h. A volume ratio of the nitrogen to the hydrogen was 2:1;

S43, the oriented electrical steel with high magnetic induction was cooled from 500° C. to room temperature. The atmosphere of the annealing furnace was nitrogen. Nitrogen flow rate was 10 $m^3$/h.

Figure 2:
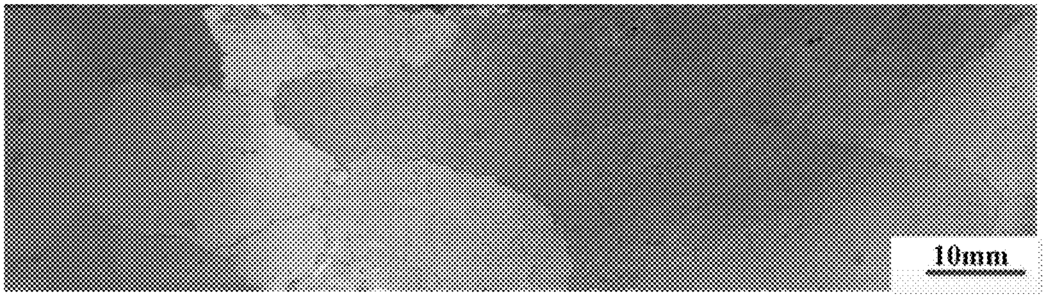
FIG. 2 is a microstructure diagram of the oriented electrical steel with high magnetic induction produced by example 2 of the present disclosure.

FIG. 2 shows the microstructure of the oriented electrical steel with high magnetic induction produced by this example. A test is carried on the oriented electrical steel with high magnetic induction produced by this example. The result shows that the microstructure is a single Goss texture, the orientation density of the Goss texture is 172, and the magnetic induction intensity $B_8$ is increased by 3% compared with products of same grade.

Comparative Example 1

The differences between the comparative example and example 1 were as follows: in step 2, the oriented electrical steel with high magnetic induction was heated from 1000° C. to 1070° C. The temperature was maintained at 1070° C. for 4 h. The oriented electrical steel with high magnetic induction was heated from 1070° C. to 1120° C. at the rate of 50° C./h. The atmosphere of the annealing furnace was gas mixture of nitrogen and hydrogen. The gas mixture flow rate was 15 $m^3$/h. The volume ratio of the nitrogen to the hydrogen was 1:4.

Figure 3:
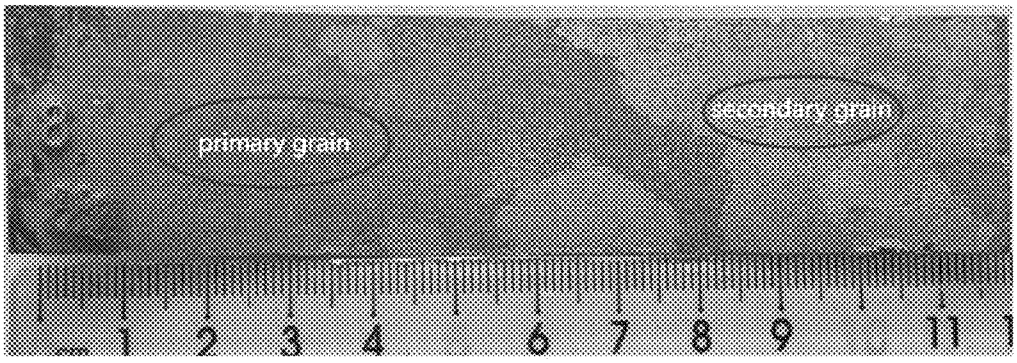
FIG. 3 is a microstructure diagram of the oriented electrical steel with high magnetic induction produced by comparative example 1.

FIG. 3 shows the microstructure of the oriented electrical steel with high magnetic induction produced by this comparative example which is mixed grains microstructure (contains primary grains and secondary grains). The secondary recrystallization is insufficient.

It can be seen from the above-mentioned examples and comparative example that impeccable secondary recrystallization and single Goss texture are formed by controlling the heating rate and the atmosphere of the annealing treatment, confirming beginning and ending temperature in accordance with different heating rate. The orientation density of the Goss texture is more than 145. The magnetic induction intensity $B_8$ is increased by 1-3% compared with products of same grade.

The above description is only a preferred embodiment of the present disclosure, and does not limit the patent scope of the present disclosure. Under the inventive concept of the present disclosure, the equivalent structural transformation made by using the content of the description of the present disclosure, or directly/indirectly used in other related all technical fields are comprised in the patent protection scope of the present disclosure.

What is claimed is:

1. An annealing method of an oriented electrical steel, characterized by comprising the following steps;

S1, carrying out a first stage of heating on the oriented electrical steel;

specific details of the first stage of heating are as follows:

S11, injecting nitrogen into an annealing furnace to prepare for annealing, wherein a nitrogen flow rate is 10-50 $m^3$/h;

S12, heating from room temperature to 500° C. at a rate of 100-200° C./h;

atmosphere of the annealing furnace is nitrogen; a nitrogen flow rate is 10-50 $m^3$/h;

S13, heating from 500° C. to 600° C. at a rate of 50-100° C./h; the atmosphere of the annealing furnace is gas mixture of nitrogen and hydrogen; a gas mixture flow rate is 10-50 $m^3$/h; a volume ratio of the nitrogen to the hydrogen is (2-3):1;

S14, maintaining temperature at 600° C. for 5-10 h; the atmosphere of the annealing furnace is gas mixture of nitrogen and hydrogen; a gas mixture flow rate is 10-50 $m^3$/h;

a volume ratio of the nitrogen to the hydrogen is (1-2):1;

S15, heating from 600° C. to 1000° C. at a rate of 50-60° C./h; the atmosphere of the annealing furnace is gas mixture of nitrogen and hydrogen; a gas mixture flow rate is 10-20 $m^3$/h; a volume ratio of the nitrogen to the hydrogen is 1:(2-3);

S2, carrying out a second stage of heating on the oriented electrical steel, and adjusting a secondary recrystallizing procedure according to a heating rate; specific details of the second stage of heating are as follows:

when the heating rate V is not more than 5° C./h, heating from 1000° C. to 1035° C., maintaining a temperature at 1035° C. for 1-2 h, and then heating from 1035° C. to 1120° C. at a rate of 50-100° C./h;

when the heating rate V is more than 5° C./h but not more than 15° C./h, heating from 1000° C. to 1045° C., maintaining a temperature at 1045° C. for 2-3 h, and then heating from 1045° C. to 1120° C. at a rate of 50-100° C./h;

when the heating rate V is more than 15° C./h but not more than 25° C./h, heating from 1000° C. to 1055° C., maintaining a temperature at 1055° C. for 3-4 h, and then heating from 1055° C. to 1120° C. at a rate of 50-100° C./h;

S3, maintaining temperature of the oriented electrical steel;

S4, cooling the oriented electrical steel; specific details of cooling are as follows:

S41, cooling from 1120° C. to 1000° C. at a rate of 30-50° C./h; the atmosphere of the annealing furnace is hydrogen; hydrogen flow rate is 10-15 $m^3$/h;

S42, cooling from 1000° C. to 500° C. at a rate of 50-100° C./h; the atmosphere of the annealing furnace is gas mixture of nitrogen and hydrogen; a gas mixture flow rate is 5-10 $m^3$/h; a volume ratio of the nitrogen to the hydrogen is (2-3):1;

S43, cooling from 500° C. to room temperature; the atmosphere of the annealing furnace is nitrogen; a nitrogen flow rate is 5-10 $m^3$/h;

the oriented electrical steel comprises, by mass percentage, 0.04-0.08 wt % C, 3.0-4.0 wt % Si, 0.05-0.2 wt % Mn, 0.004-0.012 wt % S, 0.01-0.04 wt % Al, 0.004-0.012 wt % N, 0.01-0.03 wt % Cu, 0.03-0.08 wt % Sn or Sb, 0.002-0.01 wt % RE, wherein RE is at least one of La, Ce, Nd and Y, a balance being Fe and unavoidable impurities that are present in trace amounts;

the texture of the oriented electrical steel is a single Goss texture; an orientation density of the Goss texture is more than 145.

2. The annealing method of an oriented electrical steel according to claim 1, characterized in that in the step S2, the atmosphere of the annealing furnace is gas mixture of nitrogen and hydrogen; gas mixture flow rate is 10-20 $m^3$/h; a volume ratio of the nitrogen to the hydrogen is 1:(3-4).

3. The annealing method of an oriented electrical steel according to claim 1, characterized in that in the step S3, the temperature of the oriented electrical steel is maintained at 1120° C. for 20-30 h; the atmosphere of the annealing furnace is hydrogen; hydrogen flow rate is 10-15 $m^3$/h.

* * * * *